(12) United States Patent
Gobart et al.

(10) Patent No.: US 8,616,425 B2
(45) Date of Patent: Dec. 31, 2013

(54) VEHICLE TRIM PANEL WITH CLOTHES HANGER FEATURE

(75) Inventors: James G. Gobart, Rochester, MI (US); Albert H. Butlin, Jr., Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/289,040

(22) Filed: Nov. 4, 2011

(65) Prior Publication Data

US 2013/0113230 A1  May 9, 2013

(51) Int. Cl.
*B60R 7/10* (2006.01)
*B60H 1/00* (2006.01)

(52) U.S. Cl.
USPC ........... 224/313; 224/927; 224/539; 454/137; 248/317; 211/123

(58) Field of Classification Search
USPC ............... 224/313, 927, 539; 454/136–137; 248/317, 309.1, 323, 327, 309.2; 211/123–124, 89.01, 204, 206, 211/105.1–105.6
See application file for complete search history.

(56) References Cited

U.S. PATENT DOCUMENTS

| | | | | |
|---|---|---|---|---|
| 2,493,158 | A * | 1/1950 | Mitchell | 224/313 |
| 3,229,821 | A * | 1/1966 | Heimann | 211/123 |
| 4,881,673 | A * | 11/1989 | Kapp | 224/311 |
| 5,226,569 | A * | 7/1993 | Watjer et al. | 224/313 |
| 2004/0089007 | A1* | 5/2004 | Umebayashi et al. | 62/244 |

* cited by examiner

*Primary Examiner* — Nathan J Newhouse
*Assistant Examiner* — Scott McNurlen
(74) *Attorney, Agent, or Firm* — Quinn Law Group, PLLC

(57) ABSTRACT

A trim panel for an interior upper surface of a roof of a vehicle includes a plurality of hanging features disposed thereon. Each of the hanging features includes a slot defined by the trim panel, and a hanging portion extending across the slot. The hanging portion is configured to support a clothes hanger thereon. The trim panel may extend laterally across a width of the vehicle, transverse to a longitudinal axis of the vehicle, and may be disposed adjacent a rear closure assembly, such as a hatchback of an SUV or other similar vehicle.

16 Claims, 2 Drawing Sheets

VEHICLE TRIM PANEL WITH CLOTHES HANGER FEATURE

TECHNICAL FIELD

The invention generally relates to an interior trim panel for a vehicle, and more specifically to a trim panel having a plurality of hanging features for supporting a clothes hanger thereon.

BACKGROUND

Vehicles typically include a clothes hook disposed against an upper interior surface of a roof of the vehicle. The clothes hook is normally disposed adjacent an outboard edge of the vehicle, i.e., laterally offset from a center of the vehicle, adjacent a door opening. Such clothes hooks only support two or three clothes hangers thereon.

When the vehicle is equipped with opposing clothes hooks, located adjacent opposing lateral door openings of the vehicle, a rod may be attached to and supported by each of the opposing clothes hooks, and extend laterally across a width of the vehicle. However, the rod is spaced below the upper interior surface of the roof a distance, and may interfere with passenger seating beneath the suspended rod.

SUMMARY

A vehicle is provided. The vehicle includes a body that defines an interior space. The body includes a roof that defines an upper interior surface. The body extends between a forward end and a rearward end along a longitudinal axis. A trim panel is attached to and disposed adjacent the upper interior surface of the roof, within the interior space. The trim panel defines a plurality of hanging features, with each of the plurality of hanging features configured for receiving and supporting at least one clothes hanger thereon.

An interior trim panel for supporting a headliner adjacent a roof of a vehicle is provided. The interior trim panel includes a base that is configured for attachment to an upper interior surface of the roof. A plurality of hanging features is arranged in a row on the base. Each of the plurality of hanging features includes a slot defined by the base. The slots of the plurality of hanging features are arranged in parallel with each other. Each of the plurality of hanging features includes a support portion extending across the slot thereof, and bisecting the slot into a first portion and a second portion.

Accordingly, the trim panel used to support the headliner defines a plurality of hanging features, i.e., slots, which include a hanging portion extending thereacross for supporting a clothes hanger thereon. The hanging features may be positioned parallel with each other in a row with the trim panel extending transversely across a width of the body so that the hanging features are disposed across an entire width of the vehicle. Because the hanging features are integrated into the interior trim panel and disposed adjacent the upper vertical surface of the roof, the hanging features do not interfere with passenger seating. Additionally, the trim panel may be positioned adjacent a rear closure assembly, such as a hatchback or rear door of an SUV or other similar vehicle, thereby providing easy access to the hanging features.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "forward," "rearward," etc., are used descriptively for the figures, and do not represent limitations on the scope of the invention, as defined by the appended claims.

Referring to the Figures, wherein like numerals indicate like parts throughout the several views, a vehicle is generally shown at 20. The vehicle 20 may include any type, style, and/or size, such as but not limited to a Sport Utility Vehicle (SUV), a crossover, or other similarly styled vehicle 20. As shown in the Figures, the vehicle 20 includes an SUV. However, it should be appreciated that the vehicle 20 may include some other style of vehicle 20, including a sedan or other similar vehicle 20.

Figure 1:
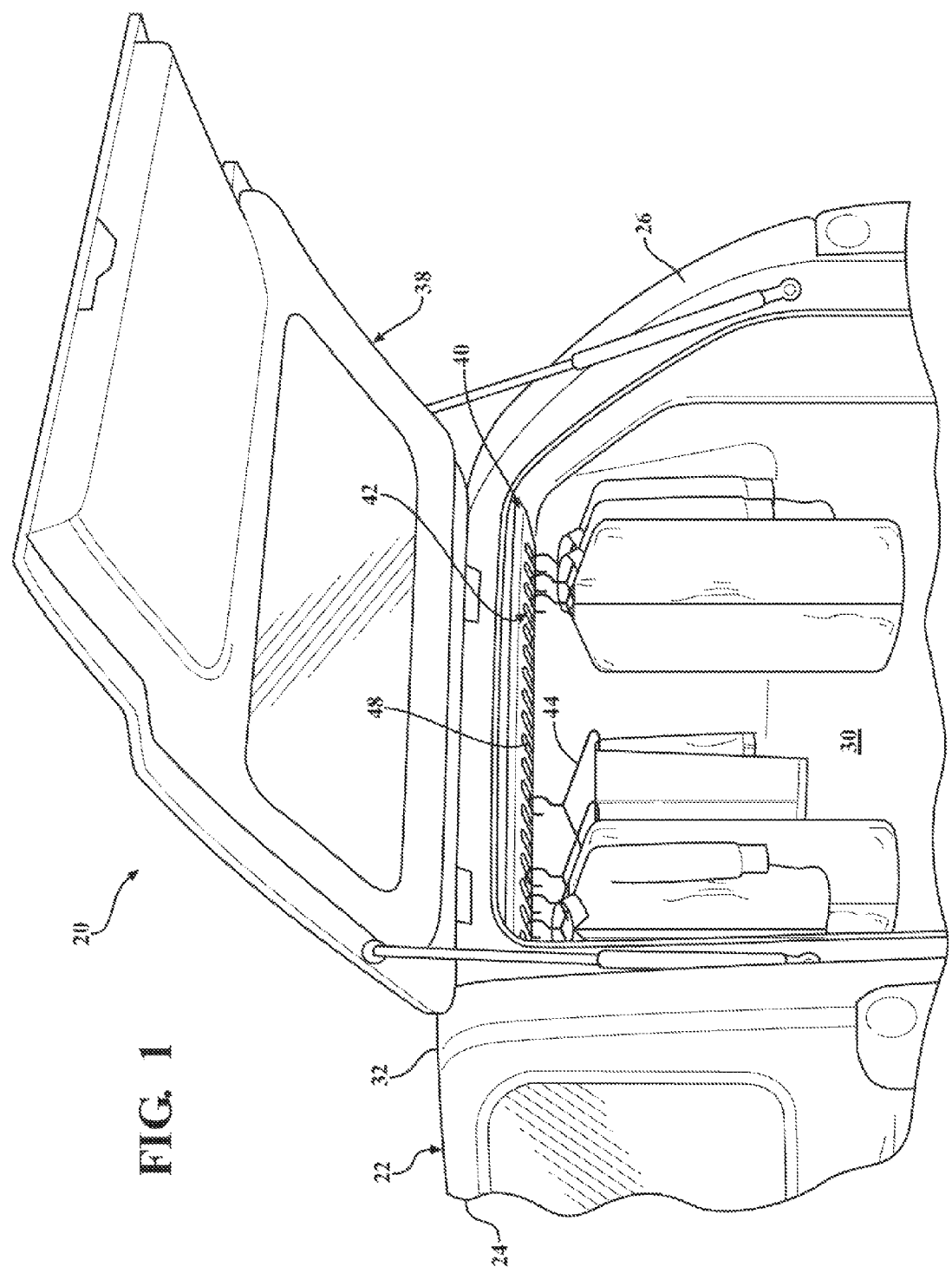
FIG. 1 is a schematic perspective view of a rearward end of a vehicle.
Figure 2:
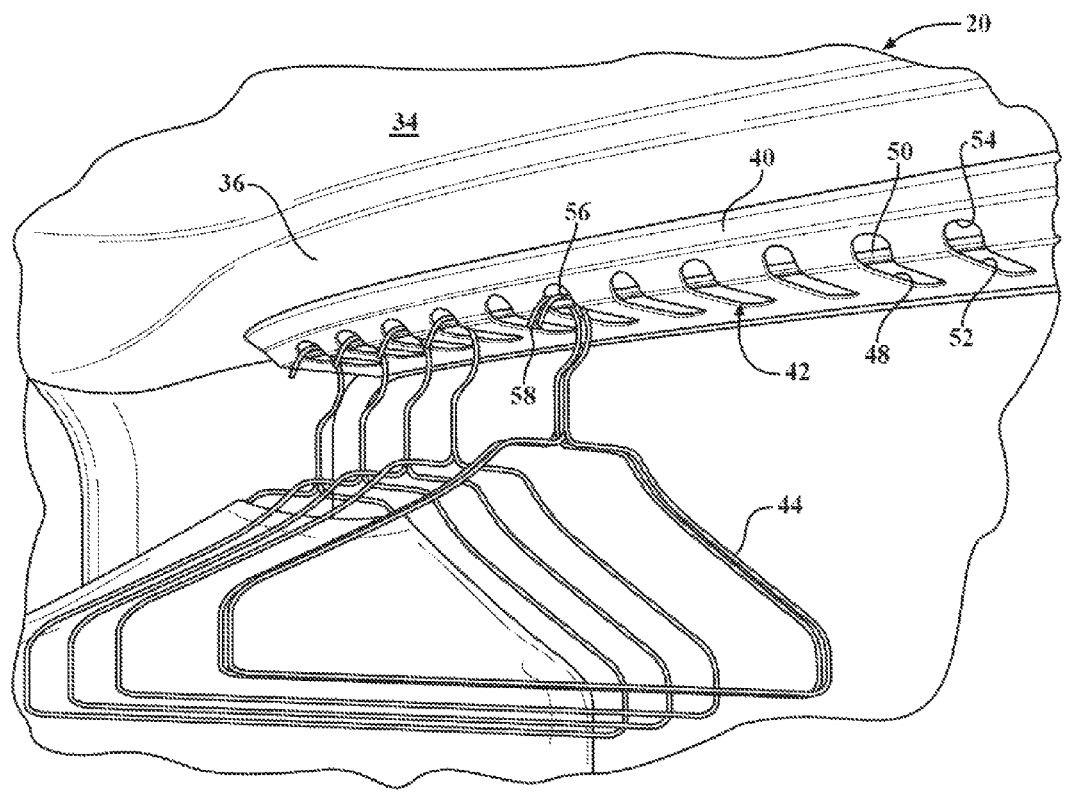
FIG. 2 is a schematic perspective view from within an interior space of the vehicle showing a trim panel having a plurality of hanging features incorporated therein.

Referring to FIG. 1, the vehicle 20 includes a body 22. The body 22 extends between a forward end 24 and a rearward end 26 along a longitudinal axis 28, shown in FIG. 3, and defines an interior space 30. The body 22 further includes a roof 32, which defines an upper interior surface 34 (shown in FIGS. 2 and 3) of the interior space 30. The roof 32 may include a headliner 36, with the headliner 36 defining the upper interior surface 34. As shown in the Figures, the body 22 includes a rear closure assembly 38. The rear closure assembly 38 is disposed at the rearward end 26 of the body 22. The rear closure assembly 38 is moveable between an open position, such as shown in FIG. 1, and a closed position (not shown). When in the open position, the rear closure assembly 38 allows access to the interior space 30. When in the closed position, the rear closure assembly 38 seals the interior space 30. The rear closure assembly 38 may include any suitable door assembly, such as but not limited to a liftgate for an SUV, a hatch for a hatchback, a pair of cargo doors for a van, or some other suitable door assembly.

The vehicle 20 further includes a trim panel 40. The trim panel 40 is attached to and disposed adjacent the upper interior surface 34 of the roof 32 within the interior space 30. More specifically, referring to FIGS. 2 and 3, the trim panel 40 is disposed against the upper interior surface 34 of the headliner 36, with the trim panel 40 at least partially supporting the headliner 36. The trim panel 40 may be positioned in any orientation relative to the longitudinal axis 28 of the vehicle 20. Preferably, however, the trim panel 40 extends laterally across the upper interior surface 34 of the roof 32 transverse relative to the longitudinal axis 28 of the body 22. Alternatively, it is contemplated that the trim panel 40 may extend in parallel relationship relative to the longitudinal axis 28 of the vehicle 20. As shown in the Figures, the trim panel 40 supports the headliner 36 across an approximate width of the body 22, transverse to the longitudinal axis 28, and is disposed adjacent the rear closure assembly 38 so as to be easily accessed through the rear closure assembly 38. However, if the vehicle 20 were to include a sedan, it is contemplated that the trim panel 40 may alternatively extend across the upper interior surface 34 of the roof 32, above a second, i.e., rear, row of passenger seating.

The trim panel 40 defines a plurality of hanging features 42. Each of the plurality of hanging features 42 is configured for receiving and supporting at least one clothes hanger 44 thereon. As shown, the plurality of hanging features 42 is arranged in parallel relationship relative to each other to define a row that extends laterally across the width of the body 22, in transverse relationship relative to the longitudinal axis 28 of the body 22.

As shown, each of the hanging features 42 are longitudinal spaced from the rear closure assembly 38 along the longitudinal axis 28 a distance sufficient to prevent interference between the rear closure assembly 38 and a clothes hanger 44 supported on any one of the plurality of hanging features 42. The distance that the trim panel 40 is spaced from the rear closure assembly 38 will vary with the specific design, size and/or orientation of the body 22 and rear closure assembly 38, and may be positioned to accommodate the curvature of the rear closure assembly 38.

The hanging features 42 may include any style and or configuration suitable for supporting the clothes hanger 44 thereon. For example and as shown, each of the plurality of hanging features 42 include a slot 48 defined by the trim panel 40, with a hanging portion 50 extending across the slot 48 and bisecting the slot 48 into a first portion 52 and a second portion 54. Accordingly, a hook 56 of a clothes hanger 44 may be inserted through the first portion 52 of the slot 48, be positioned over the hanging portion 50 of the hanging feature, with a distal end 58 of the hook 56 passing through the second portion 54 of the slot 48, such that the hook 56 at least partially wraps around the hanging portion 50 of the hanging feature. The slots 48 are arranged in parallel with each other and in parallel with the longitudinal axis 28 of the body 22. The slots 48 define a row that extends across the width of the body 22 adjacent the rear closure assembly 38, thereby providing easy access to multiple hanging features 42.

The trim panel 40 and the hanging portion 50 may be integrally formed together from a polymer material, such as a plastic or a nylon. Alternatively, the trim panel 40 and the hanging portion 50 may be separate components mechanically fastened together. For example, the hanging portion 50 may include a long metal rod supported by the trim panel 40 and extending across all of the slots 48 defined by the trim panel 40 to form the hanging portion 50 of each slot 48.

Figure 3:
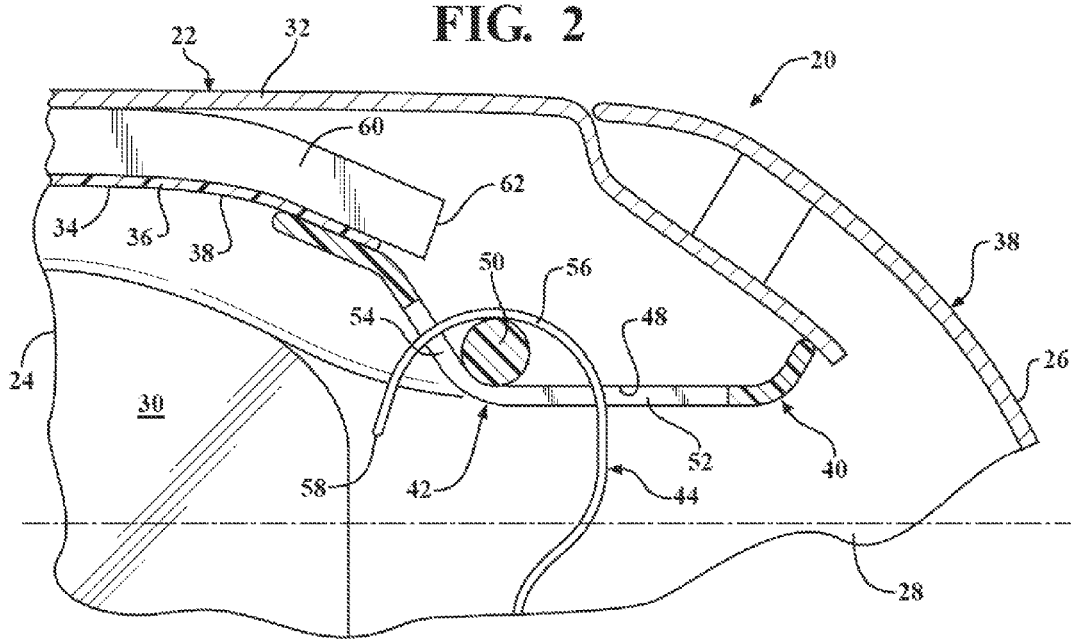
FIG. 3 is a schematic cross sectional view of the vehicle.

Referring to FIG. 3, the body 22 may further include a Heating Ventilation Air Conditioning (HVAC) duct 60. The HVAC duct 60 includes an outlet 62 disposed between the roof 32 and the trim panel 40. The HVAC duct 60 is part of an HVAC system that provides treated air, such as heated air or cooled air, to the interior space 30 of the vehicle 20. The outlet 62 of the HVAC duct 60 delivers a flow of air to the trim panel 40, with the hanging features 42, i.e., the slots 48 in the trim panel 40, providing fluid communication between the outlet 62 of the HVAC duct 60 and the interior space 30 of the body 22. As such, the hanging features 42, i.e., the slots 48 in the trim panel 40, act as discharge vents to direct airflow therethrough and into the interior space 30 of the vehicle 20. Accordingly, the trim panel 40 not only operates to support the headliner 36 and provide the plurality of hanging features 42, but also operates as a grille or covering to conceal the outlet 62 of the HVAC duct 60 and distribute the flow of air therefrom.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
    a body defining an interior space and having a roof defining an upper interior surface, the body extending between a forward end and a rearward end along a longitudinal axis; and
    a trim panel attached to and disposed adjacent the upper interior surface of the roof within the interior space;
    wherein the trim panel defines a plurality of hanging features, with each of the plurality of hanging features configured for receiving and supporting at least one object thereon;
    wherein each of the plurality of hanging features includes a slot defined by the trim panel, and a hanging portion extending across the slot and bisecting the slot into a first portion and a second portion; and
    wherein the body includes a Heating Ventilation Air Conditioning (HVAC) duct having an outlet disposed between the roof and the trim panel, wherein the plurality of hanging features provide fluid communication between the outlet of the HVAC duct and the interior space of the body to direct airflow therethrough.

2. A vehicle as set forth in claim 1 wherein the plurality of hanging features are arranged in parallel relationship relative to each other.

3. A vehicle as set forth in claim 2 wherein the trim panel extends transversely across the upper interior surface of the roof transverse relative to the longitudinal axis of the body.

4. A vehicle as set forth in claim 3 wherein the plurality of hanging features are arranged in a row extending transverse relative to the longitudinal axis of the body.

5. A vehicle as set forth in claim 1 wherein the trim panel and the hanging portion are integrally formed together from a polymer.

6. A vehicle as set forth in claim 1 wherein each of the hanging portions are defined by a singular rod extending across each slot of the plurality of hanging features.

7. A vehicle as set forth in claim 1 wherein the body includes a rear closure assembly disposed at the rearward end of the body and moveable between an open position allowing access to the interior space and a closed position sealing the interior space, wherein the trim panel is disposed adjacent the rear closure assembly.

8. A vehicle as set forth in claim 7 wherein each of the hanging features are longitudinally spaced from the rear closure assembly along the longitudinal axis a distance sufficient to prevent interference between the rear closure assembly and a clothes hanger supported on one of the plurality of hanging features.

9. A vehicle as set forth in claim 1 wherein the roof includes a headliner, wherein the headliner defines the upper interior surface of the roof, and wherein the trim panel at least partially supports the headliner.

10. A vehicle as set forth in claim 9 wherein the trim panel supports the headliner across an approximate width of the body transverse to the longitudinal axis.

11. An interior trim panel for supporting a headliner adjacent a roof of a vehicle, the interior trim panel comprising:
    a base configured for attachment to an upper interior surface of the roof; and
    a plurality of hanging features arranged in a row on the base, wherein each of the plurality of hanging features includes a slot defined by the base;
    wherein the slots of the plurality of hanging features are arranged in parallel with each other;

wherein each of the plurality of hanging features includes a support portion extending across the slot thereof and bisecting the slot into a first portion and a second portion; and wherein the vehicle includes a Heating Ventilation Air Conditioning (HVAC) duct having an outlet disposed between the roof and the interior trim panel, wherein the plurality of hanging features provide fluid communication between the outlet of the HVAC duct and an interior space of the vehicle to direct airflow therethrough.

12. A vehicle as set forth in claim 11 wherein the base and the hanging portion are integrally formed together from a polymer.

13. A vehicle comprising:
a body defining an interior space and having a roof having a headliner defining an upper interior surface, the body extending between a forward end and a rearward end along a longitudinal axis;
a trim panel attached to and disposed adjacent the upper interior surface of the headliner within the interior space and extending transversely across the upper interior surface of the headliner transverse relative to the longitudinal axis of the body;
wherein the trim panel at least partially supports the headliner transversely across an approximate width of the body transverse relative to the longitudinal axis;
wherein the trim panel defines a plurality of hanging features, with each of the plurality of hanging features configured for receiving and supporting at least one clothes hanger thereon;

wherein the plurality of hanging features are arranged in parallel relationship relative to each other to define a row extending transverse relative to the longitudinal axis of the body;

wherein each of the plurality of hanging features include a slot defined by the trim panel and includes a hanging portion extending across the slot and bisecting the slot into a first portion and a second portion; and wherein the body includes a Heating Ventilation Air Conditioning (HVAC) duct having an outlet disposed between the roof and the trim panel, wherein the plurality of hanging features provide fluid communication between the outlet of the HVAC duct and the interior space of the body to direct airflow therethrough.

14. A vehicle as set forth in claim 13 wherein the trim panel and the hanging portion are integrally formed together from a polymer.

15. A vehicle as set forth in claim 13 wherein the body includes a rear closure assembly disposed at the rearward end of the body and moveable between an open position allowing access to the interior space and a closed position sealing the interior space, wherein the trim panel is disposed adjacent the rear closure assembly.

16. A vehicle as set forth in claim 15 wherein each of the hanging features are longitudinal spaced from the rear closure assembly along the longitudinal axis a distance sufficient to prevent interference between the rear closure assembly and a clothes hanger supported on one of the plurality of hanging features.

* * * * *